Nov. 24, 1964 B. SCIRETTI ETAL 3,158,694
THIRD PARTY CALLING SIGNAL FOR AUTOMATIC TELEPHONE SYSTEM
Filed May 24, 1960
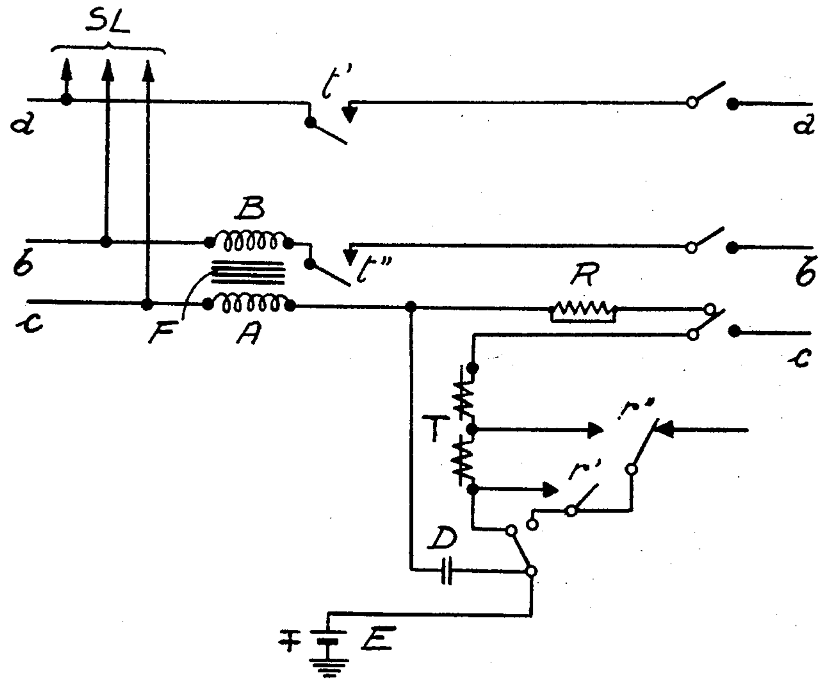
INVENTORS:
Benito Sciretti
Giovanni Aceti
BY Michael S. Striker
Attorney United States Patent Office 3,158,694
Patented Nov. 24, 1964

3,158,694

THIRD PARTY CALLING SIGNAL FOR AUTOMATIC TELEPHONE SYSTEM

Benito Sciretti and Giovanni Aceti, both of Via Sanfelice 12, Milan, Italy

Filed May 24, 1960, Ser. No. 31,303
Claims priority, application Italy, May 26, 1959, 8,909/59; Dec. 1, 1959, 20,005/59
3 Claims. (Cl. 179—84)

The present invention concerns an automatic telephone system, and more particularly an arrangement which makes it possible that during a two-way telephone conversation between two parties a third party calling one or the other of the two talking parties is enabled to transmit a warning signal to at least one of the two talking parties for indicating that a third party is trying to reach one of the two talking parties.

In conventional telephone circuits means are provided for preventing during a two-way telephone conversation by two parties any disturbance thereof by incoming calls from third parties. These means comprise calling and guard circuits which are fed from the voltage carrying line wire and which comprise a relay providing a parallel connection to ground and a switch which is in open position when the telephone apparatus is free to accept a call. When, however, a subscriber has been called, said switch is automatically closed and thereby shunts the calling relay so that, as long as this condition lasts, the relay cannot be energized any more whereby the talking parties cannot be further disturbed by incoming calls. However, this system has the drawback that none of the talking parties knows that a third party is calling. This is a characteristic of automatic telephone system because in a manually operated switchboard system the telephone operator at the exchange could intervene in such a case.

It is therefore an object of this invention to provide, in an automatic telephone system, for a circuit arrangement by means of which during a two-way conversation between two subscribers at least one of the latter may be advised that a third party is calling one of the talking subscribers.

It is another object to provide for a circuit arrangement as set forth which when operated does not cause any disturbance of the connection between the two parties having a conversation but only giving them a signal whereafter they have the opportunity of interrupting their conversation if they desire or one of them desires to accept the call of a third party.

With above objects in view the invention includes in an automatic telephone system having at least one first calling and one called station and a second calling station, each station having a call relay in a preselector circuit, said call relay of any such station having a coil which is shunted when the respective station is busy after having called another station, and first and second wires serving to connect said calling and called stations, and a service wire serving to connect said preselector circuits thereof, in combination, in each of said first calling and called stations a "notification of call" signal producing means including inductive coupling means arranged between the respective preselector circuit and one of said first and second wires, for causing transmission of calling pulses emanating from said second calling station to said one of said first and second wires connecting said first calling and called stations while said call relay of said calling station is in shunted condition, so that during a conversation taking place between said first calling and called stations an audible "notification of call" signal corresponding to said calling pulses of said second calling station is transmitted to said first calling and called stations.

It will be seen that the above mentioned induction means is capable of transmitting a signal caused by the incoming call of a third party, to at least one of the two subscribers having a conversation with each other. Whenever such a call from a third party occurs during a conversation taking place, a well defined and characteristic signal will be delivered to the line wire connecting the two stations that are having the conversation, and thus the signal is transmitted to the two talking parties.

A capacitor is provided according to the invention in parallel connection with the calling and guard circuit of the preselector for controlling the induction means under certain conditions and in order to transmit to the induction means a pulse caused by the dialing of the third party calling. The duration of this pulse which produces the signal to the talking parties depends on the discharge time of the capacitor.

It will be seen that the system according to this invention has the advantage of being rather inexpensive and can be introduced in a simple manner into an existing telephone system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one embodiment of the invention is illustrated as a schematic circuit diagram.

The diagram illustrates only those elements of a telephone station or apparatus which are needed for explaining the invention.

The wires serving to connect the particular station with others are marked *a* and *b*, while *c* designates the service wire connecting the preselectors. T is the calling and cut-off relay which upon its energization causes its contacts *t'* and *t''* in lines *a* and *b*, respectively, to change to closed positions whereby connection between the called and the calling station is established. However, part of the coil of relay T can be short-circuited, according to established convention, by means of relay contacts *r'* and *r''* when a call is received and accepted so that no further incoming call can energize the relay T.

According to the invention an inductive coupling is provided between wires *c* and *b* by means of a first coil A inserted in wire *c* as shown and inductively coupled with a second coil B inserted in wire *b*. An iron core F is associated with coils A and B and serves to increase the inductive transmission of energy, at a predetermined amplification ratio, from coil A to coil B. A capacitor D is connected in parallel with the relay coils T between battery E and wire *c*.

The circuit arrangement operates as follows:

In the case that the shown circuit is that of the telephone apparatus which is "calling" apparatus during a telephone conversation with another "called" station, the relay T is cut off in the usual manner and the wire *c* is connected to the preselector.

If now a call signal or voltage pulse arrives from a third party calling via the *c* wire of the line system SL, first the capacitor D is charged which is connected with the wire *c*. The capacitor thereafter discharges across coil A and the discharge pulse is transmitted inductively, with amplification, to the coil B and thereby to the wire *b* so that the receiver telephone of the particular apparatus issues accordingly a characteristic audible signal.

On the other hand, if the shown circuit is that of the telephone apparatus which is the "called" apparatus during a telephone conversation with a "calling" station, the relay T is short-circuited as mentioned above. But again the calling signal, without charging the capacitor D, reaches the coil A from where it is transmitted in the same manner as above described to the coil B so as to be heard as an audible signal in the receiver telephone of the particular subscriber.

The signal, that is transmitted in whatever manner through the inductance coupling A–B, is perceived at the apparatus already busy in conversation in the form of an acoustic signal sufficiently distinguishable for signalizing the incoming call from a third telephone apparatus.

Of course the realization of this invention may take place in any further possible form; so e.g. coils A and B, and condenser D can be enclosed within a casing in order to be easily and quickly set up in connection with whatever preselector of a telephone system.

It will be understood that each of the elements described above, or two or more together, may also find a useful application in other types of a circuit arrangement within an automatic telephone system for notifying talking subscribers of an incoming call of a third party differing from the types described above.

While the invention has been illustrated and described as embodied in a circuit arrangement within an automatic telephone system for notifying talking subscribers of an incoming call of a third party, including induction means between the calling and the conversation carrying circuits of the telephone system, it is not intended to be limited to the details shown, since various modifications and structural changes may be made without in any way departing from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an automatic telephone system having at least one first calling and one called station and a second calling station, each station having a call relay in a preselector circuit, said call relay of any such station having a coil which is shunted when the respective station is busy after having called another station, and first and second wires serving to connect said calling and called stations, and a service wire serving to connect said preselector circuits thereof, in combination, in each of said first calling and called stations a "notification of call" signal producing means including inductive coupling means arranged between the respective preselector circuit and one of said first and second wires, for causing transmission of calling pulses emanating from said second calling station to said one of said first and second wires connecting said first calling and called stations while said call relay of said calling station is in shunted condition, so that during a conversation taking place between said first calling and called stations an audible "notification of call" signal corresponding to said calling pulses of said second calling station is transmitted to said first calling and called stations.

2. In an automatic telephone system having at least one first calling and one called station and a second calling station, each station having a call relay in a preselector circuit, said call relay of any such station having a coil which is shunted when the respective station is busy after having called another station, and first and second wires serving to connect said calling and called stations, and a service wire serving to connect said preselector circuits thereof, in combination, in each of said first calling and called stations a "notification of call" signal producing means including a first induction coil arranged in the respective preselector circuit, a second induction coil inductively coupled with said first induction coil and arranged in one of said first and second lines, for causing transmission of calling pulses arriving through said service wire and emanating from said second calling station to said one of said first and second wires connecting said first calling and called stations while said call relay of said calling station is in shunted condition, so that during a conversation taking place between said first calling and called stations an audible "notification of call" signal corresponding to said calling pulses of said second calling station is transmitted to said first calling and called stations.

3. In an automatic telephone system having at least one first calling and one called station and a second calling station, each station having a call relay in a preselector circuit, said call relay of any such station having a coil which is shunted when the respective station is busy after having called another station, and first and second wires serving to connect said calling and called stations, and a service wire serving to connect said preselector circuits thereof, in combination, in each of said first calling and called stations a "notification of call" signal producing means including a first induction coil arranged in the respective preselector circuit, a second induction coil inductively coupled with said first induction coil and arranged in one of said first and second wires, and a condenser means connected in parallel with said coil of said call relay and in series with said first induction coil so as to be charged by calling pulses arriving from said second calling station while said call relay coil is shunted and for discharging through said first induction coil in correspondence to each incoming calling pulse, said condenser being disconnected when said call relay coil is not shunted, whereby transmission of calling pulses arriving through said service wire and said coil of said calling relay, and emanating from said second calling station is effected to said one of said first and second wires connecting said first calling and called stations while said call relay of said calling station is in shunted condition, so that during a conversation taking place between said first calling and called stations an audible "notification of call" signal corresponding to said calling pulses of said second calling station is transmitted to said first calling and called stations.

References Cited in the file of this patent

UNITED STATES PATENTS

| | | |
|---|---|---|
| 1,429,003 | Whitaker | Sept. 12, 1922 |
| 2,038,427 | Friedlander | Apr. 21, 1936 |
| 2,062,019 | Arnold | Nov. 24, 1936 |
| 2,275,352 | Durante | Mar. 3, 1942 |
| 2,510,011 | Corbett | May 30, 1950 |